United States Patent [19]

Bibbee

[11] 4,311,469

[45] Jan. 19, 1982

[54] DISPLAY BOARD FOR EDUCATIONAL EXERCISES

[76] Inventor: Ernest B. Bibbee, 2281 Biard Rd., Fostoria, Ohio 44830

[21] Appl. No.: 150,564

[22] Filed: May 16, 1980

[51] Int. Cl.³ .............................................. G09B 1/22
[52] U.S. Cl. .................................. 434/404; 434/348; 434/332
[58] Field of Search ............... 434/404, 402, 167, 174, 434/198, 332, 348, 349

[56] References Cited

U.S. PATENT DOCUMENTS

| | | | |
|---|---|---|---|
| 3,036,386 | 5/1962 | Seligmann | 434/174 |
| 3,136,074 | 6/1964 | Hawkins | 434/348 |
| 3,199,228 | 8/1965 | Rubin | 434/167 |
| 3,200,517 | 8/1965 | D'Agostino | 434/174 |
| 3,460,273 | 8/1969 | Boyd | 434/174 |
| 3,510,961 | 5/1970 | Hawkins | 434/348 |
| 3,673,712 | 7/1972 | Dacey et al. | 434/348 X |
| 3,745,673 | 7/1963 | Jimerson et al. | 434/332 |
| 3,762,071 | 10/1973 | Coffman et al. | 434/174 |

*Primary Examiner*—William H. Grieb
*Attorney, Agent, or Firm*—Wilson, Fraser, Barker & Clemens

[57] ABSTRACT

A display board having a window in which an education exercise unit or task is presented for viewing on a removable plate. Front and rear panels enclose a rotatable disk containing radially arrayed pockets for carrying stacks of removable task plates individually into registry with the front panel window. Each pocket is adapted to maintain a plurality of task plates in tiers. Retaining rings concentric with the axis of rotation of the disk, mounted on the inner face of the front panel, and of successively greater diameter and lesser height, are arranged to be engaged with detents on the removable task plates. A slot in the margin of the front and rear panels in radial alignment with the viewing window, enables a handle on the task plates to be grasped individually for release of their detents and withdrawal from the disk pockets. The task plates, as tokens of achievement by the student, can be accumulated on display racks on the front face of the board. Window masks shield the exercise until it is to be undertaken. Gates are provided to close apertures in the retaining rings to lock the task plates within their pockets.

19 Claims, 6 Drawing Figures

DISPLAY BOARD FOR EDUCATIONAL EXERCISES

BACKGROUND OF THE INVENTION

It has been found that pupil interest can be stimulated, particularly in special education classes, by utilizing mechanical educational devices. Additionally, enthusiasm can be engendered by introducing competitive elements to the exercise wherein the manipulations of the mechanical devices include the accumulation on behalf of the student of tokens of accomplishment in meeting the challenge of the educational exercise.

Prior art educational devices have employed the game board principles of presenting a masked problem on some medium within the board structure which is selectively unveiled by the manipulative efforts of the instructor or the student to inject the enthusiasm of anticipation into the teaching process. A number of boards with windows in which problems are displayed selectively, including groups of problems mounted on moveable elements such as rotating disks, are known.

Seligmann U.S. Pat. No. 3,036,386 for Rhyming Device, discloses a pair of superposed disks centrally pivoted on each other and adapted to be rotated with respect to each other around the pivot by means of radially projecting ears. The front disk has a window and adjacent tab holders aligned along the disk radius. In use, tabs having letters marked thereon, are inserted in the holders and consonants or phonetic consonant groups, imprinted on the rear disk in a circular array, are individually presented in the window adjacent the tabs to form desired rhyming words or phonetic arrangements with the letters or letter groups on the tabs.

Other superposed relatively rotatable disk devices for forming words or word training are shown in Rubin U.S. Pat. No. 3,199,228 for Word Training Aid, Boyd U.S. Pat. No. 3,460,273 for Educational Device, and Coffman et al U.S. Pat. No. 3,762,071 for Teaching Aid.

Rubin employs a masked disk bearing a plurality of concentric circular arrays of pictures of objects with an adjacent word identifying the object. The masking disk has a radial, elongate window which is partially screened by a slider element which is moveable radially of the disk and contains a window to unmask only one picture-word combination of one of the circular arrays. In a further embodiment, an additional slider, having a masking window, is carried by the radial slider whereby the identifying word can be selectively masked.

Boyd combines two centrally pivoted disks with a masking panel containing a plurality of windows displaying interrelated information. Tabs can be applied to the periphery of a front disk and can be positioned adjacent a window to form words with the letters displayed in the window.

Coffman et al. includes a masking disk having a display window and an opening for access to sockets on underlying disks. An implement can be inserted in the sockets exposed through the openings to rotate the disks and align the characters imprinted on the disks with the display window. Three superposed, rotatable disks are shown with the two most proximate the masking disk having windows to reveal characters on the disks which underly them.

Board type devices are illustrated in Hawkins U.S. Pat. No. 3,136,074 for Educational Device; D'Agostino U.S. Pat. No. 3,200,517 for Word Forming Device; Hawkins U.S. Pat. No. 3,510,961 for Educational Devices, and Jimerson et al. U.S. Pat. No. 3,745,673 for Educational Game Toy. In each of these devices, one or more windows are provided in a front panel on which one or more disks having imprinted material is mounted. The disks are rotatable to bring the imprinted material into registry with a window. Information related to the imprinted material is presented at other windows by displacement of auxiliary devices, including slides and rotatable disks.

None of the aforementioned devices lends itself to competitive teaching techniques wherein information bearing elements are removed from the device as tokens of achievement. Nor do these mechanisms accomodate plural cycles of problem presentation as rounds in a teaching effort.

SUMMARY OF THE INVENTION

The present invention relates to educational game devices and, more particularly, to such devices for selectively and individually presenting problems at a viewing window and for selectively and individually separating the problem bearing element from the display.

In accordance with the above, one feature of the invention comprises a display panel having a moveable magazine for problem bearing elements mounted thereon to be unmasked when presented at a window on the panel.

Another feature involves a disk magazine for problem bearing elements which mounts a plurality of the elements in each of a plurality of radial pockets.

A third feature resides in a plurality of concentric retainer rings mounted about the pivot axis for a disc magazine and secured to the back side of the display panel to cooperate with detents or retainer pins on the problem bearing elements to retain them in the magazine as the disk is rotated about its axis.

A further feature comprises a gate for releasing retainer pins from the retainer rings.

Additional features of the invention will be appreciated from the following detailed description of a preferred embodiment thereof when read with reference to the accompanying drawings.

DETAILED DESCRIPTION OF THE PREFERRED EMBODIMENT

Figure 1:
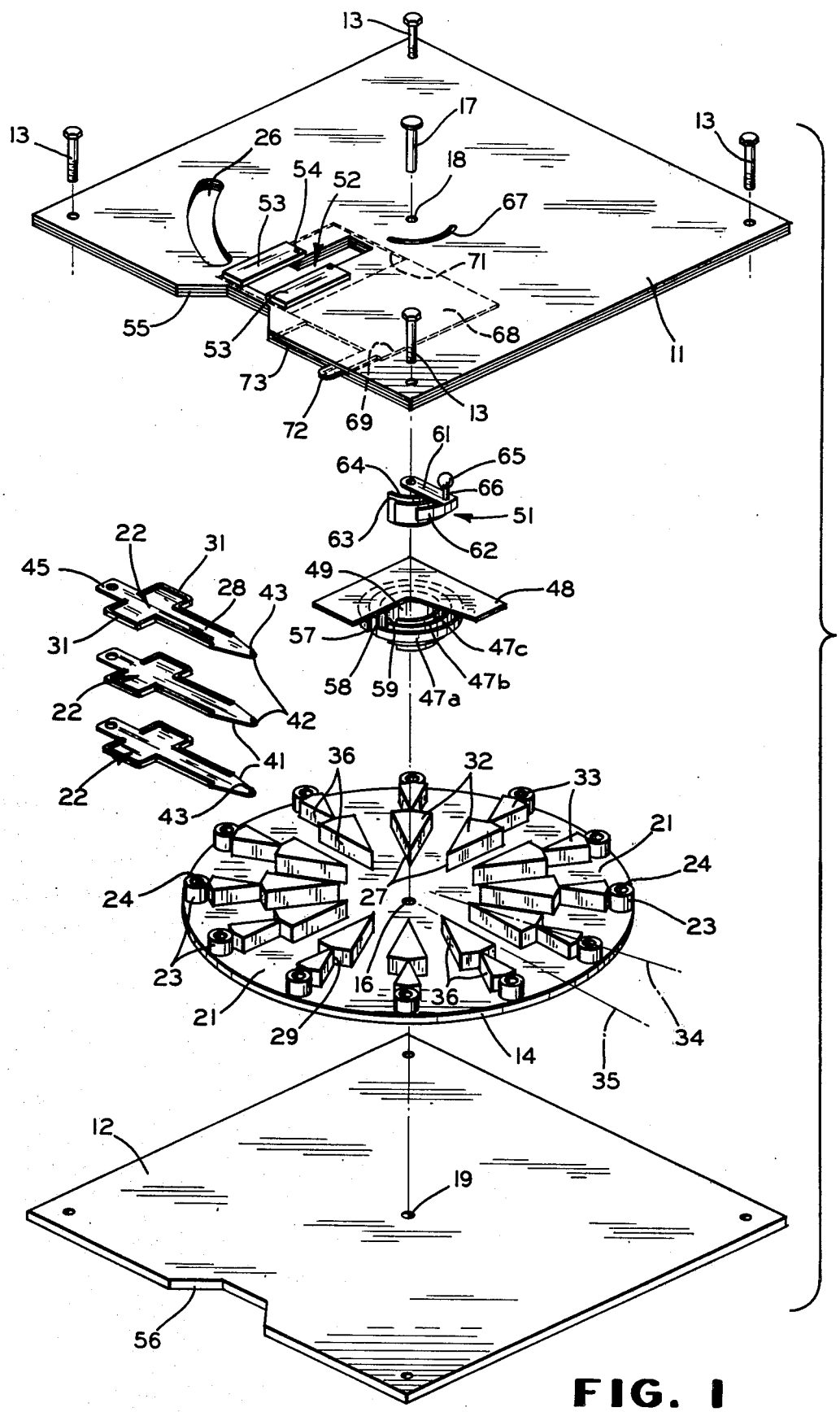
FIG. 1 is an exploded perspective of one embodiment of the invention showing three problem bearing elements for positioning in one pocket of a multipocketed disk magazine.

The educational device of this invention comprises front and rear panels 11 and 12 maintained in spaced relation parallel to, and registering with each other by fasteners 13. A rotatable disk 14 is pivotally mounted at its center 16 by a pivot pin 17 which passes through suitable apertures 18 and 19 in the front and rear panels 11 and 12 respectively. Disk 14 is sandwiched between front and rear panels 11 and 12 and can be enclosed thereby.

Figure 3:
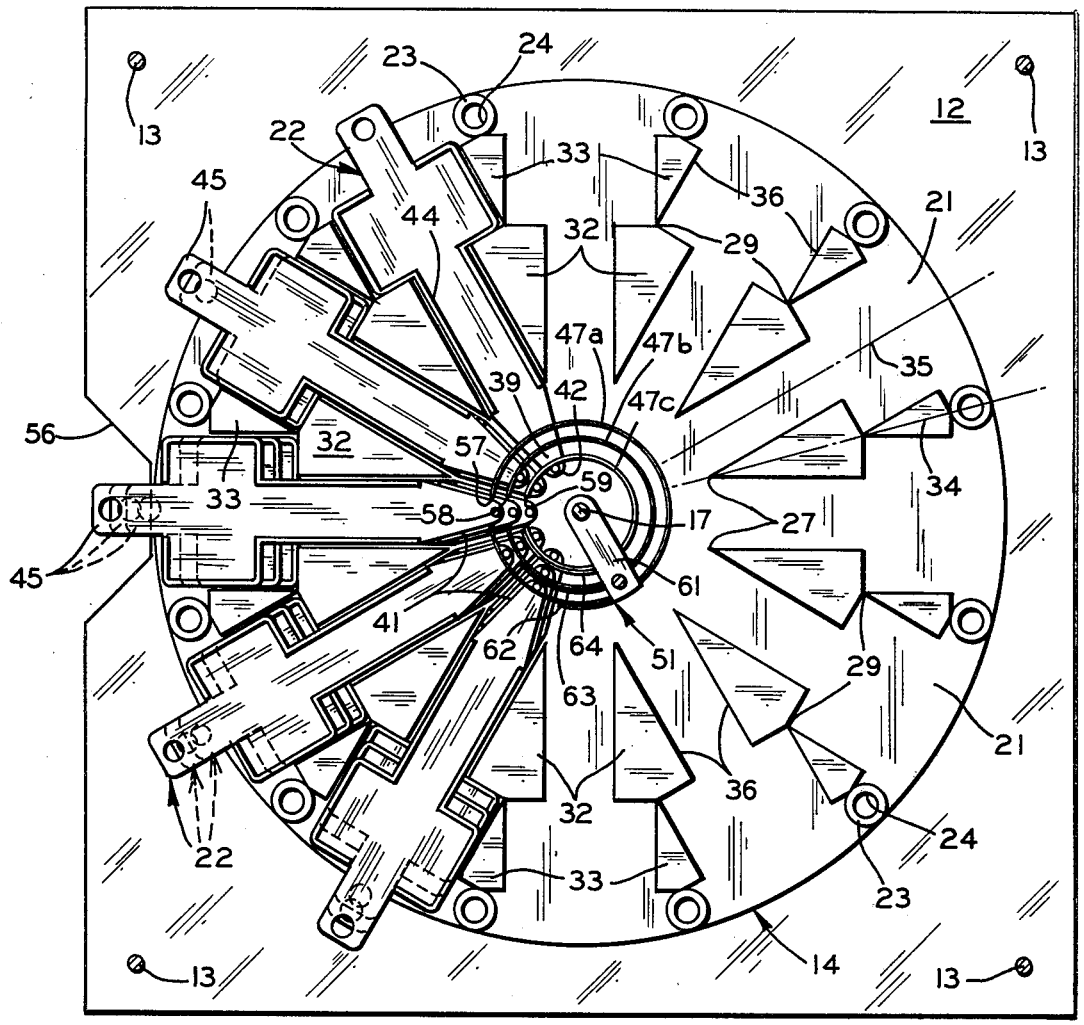
FIG. 3 is a plan view of the front of the device with the front panel removed to disclose the retainer rings, the problem bearing elements, and their retention means.

Disk 14 is shown in plan view in FIG. 3. It comprises a circular base carrying a radial array of pockets 21 for information bearing elements 22. The pockets 21 generally conform to the elements 22 which are cruciform to enable them to be employed for a radial display area or for a circumferential or perpendicular to the radius display area. Rotation of the disk within the panels is facilitated by buttons 23 arranged in a circular array on the radial centerlines between each pocket 21 on the disk to form finger sockets 24. Sockets 24 are accessable through the front panel 11 by means of an arcuate, finger slot 26 which is conveniently of an arcuate length equal to the distance between two adjacent pockets at the radial distance of buttons 23 from the pivot for the disk to register with the path of travel of those buttons in advancing the rotation of the disk one step in its display function.

Disk 14 has pockets 21 spaced at regular increments of arc radially around its center. In the illustrated embodiment, a thirty inch square display panel assembly has a disk magazine 14 twenty-six inches in diameter containing twelve pockets, each having their radial center lines spaced thirty degrees apart. This array accomodates cruciform task plates 22 of an overall length of eleven and one-half inches which have display areas about eight inches long and two inches wide in the radial display or perpendicular thereto about four and one-half inches by three inches. Disk area is employed effectively by arranging the pockets 21 so their walls converge to a point at the innermost point 27 of their walls for the shaft portion 28 of the cross, and at the innermost point 29 of their walls for the arms 31. The dividers are made up in two sections as inner section 32 and outer section 33, each of which are generally pie shaped with their bisecting longitudinal axes on a radius 34, bisecting the area between radii of the disk which coincide with the longitudinal center line 35 of adjacent pockets 21. The height of the walls 34 of pockets 21 is sufficient to accomodate the sum of the total thicknesses of the number of task plates 22 to be accomodated in each pocket, in the example three thicknesses.

Figure 6:
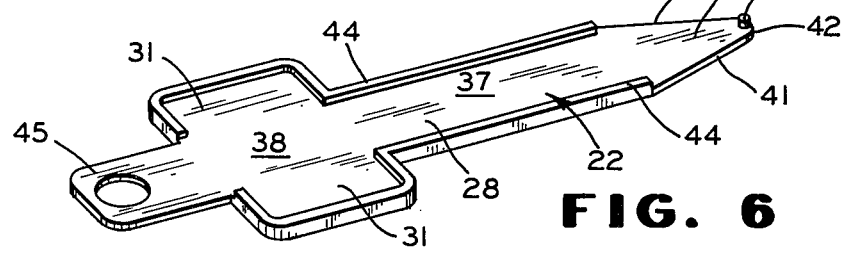
FIG. 6 is a perspective view of the problem bearing elements.

As shown in FIG. 6, a task plate 22 has a longitudinal display area 37 on its shank and a transverse display area 38 on its crossarms. It is of greater length than pocket 21 and display areas with an inner end to afford a means of retaining it within the magazine formed by the pocketed disk. Each plate has an innermost shaft portion 39 in which its margins 41 converge to avoid interference between plates in adjacent magazine pockets. Accordingly, the margins 41 converge at about fifteen degrees to the longitudinal center line of the plate in the example. The apex 42 of the convergent ends of the margins 41 is truncated, or formed with a short radius, and supports a detent or retaining pin 43 which stands up from the indicia bearing surface of the plate. A raised lip or bead 44 of a height generally equal to detent 43 surrounds the display areas 37 and 38 and is terminated at the radial inner end of the plate short of the detent to maintain the detent 43 as a protuberance which cooperates with retaining means for the plates. Thus, stacked plates are spaced sufficiently so that the plate retaining protuberance of an underlying plate clears the back side of the superjacent plate and permits the plates to be slid past each other along the radial path of the pocket axes. Typically, plates can be formed from 3/32 inch stock and have a retaining pin and peripheral bead in regions spaced from the pin of about 3/32 inch, thereby forming a total task plate thickness of 3/16 inch. Thus, in a three tiered array of plates, it is desirable to employ a pocket wall height of about 9/16 to ⅝ inch.

Figure 4:
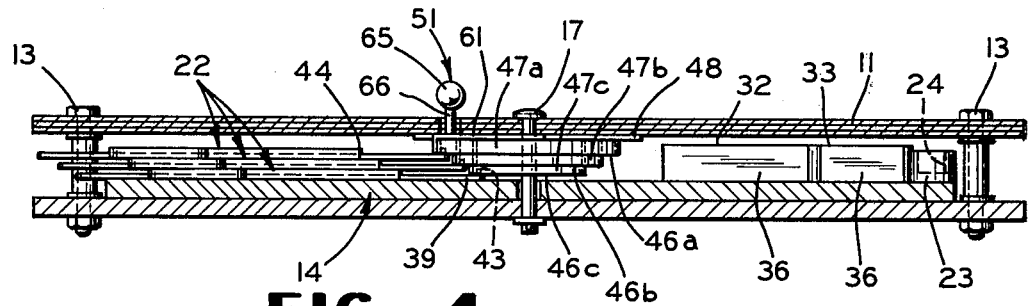
FIG. 4 is a sectioned elevational of the device of FIG. 2 taken along the line 4—4 of FIG. 2.

A finger grip 45 on the outer end of the task plate extends beyond the cross arms to facilitate handling. The grip 45 extends into a region of the magazine which is accessible from the exterior of the panel so that plates 21 can be inserted into and withdrawn from pockets 22 by grasping the grip. Advantageously, all task plates are of like form and size so that when stacked and tiered in their magazine pockets 22, as will be described, the grips 45 are tiered with that of the uppermost plate lying somewhat outward of underlying plates as shown in FIG. 4.

The task plates can bear permanent imprints, adhesively applied information, or written information. Two uses are particularly contemplated, verbal training where the information is presented along the axis of the plate in display area 37, and numerical training where the information is presented transverse of the axis and along the cross arms 31 in display area 38, for example as a column of numbers and a sum. One suitable form is of stiff, planar material which will receive writing as with a wax pencil.

Superposed task plates 22 are maintained in a tiered relationship in a pocket 21 by engaging their respective retainer pins 43 with the lip 46 of a retainer ring 47 mounted on the inner face of the front panel 11. A plurality of concentric retainer rings are mounted concentric with the pivot axis defined by pin 17 as on a mounting plate 48. The outermost ring 47a is of less height so that its lip 46a is engaged by passing pin 43 of the upper most plate 22 within its circumference. Ring 47a is at least the height of the pin 43. The next lower plate 22 is engaged by pin 43 with a next inner ring 47b which is of a height greater than 47a by the thickness of the plates 22 and their peripheral beads 44. The lowest plate 22 is retained by the inner most and highest retainer ring 47c, also of a height greater than 47b by the thickness of the plates 22 and their beads 44. With this geometrical relationship, the plates stack in each pocket in a tiered pattern in which they are offset from each other. That tiered pattern is such that the plate nearest the back of the front panel is radially outward of its underlying plate by the difference of radius between rings 47a and 47b and each succeeding underlying plate is similarly offset. It will be noted that interference between the plate beads 44 and the ring lips 46 is avoided by terminating the beads short of the tip 39 of task plate 22 and retaining pin or detent 43.

The task plate retainer can be an assembly of a base 48 to which is secured, as by welding, right circular cylinders forming rings 47a, 47b and 47c. Base plate 48 is shown with a relieved region 49 to accomodate motion of a gate mechanism 51, to be described.

Figure 2:
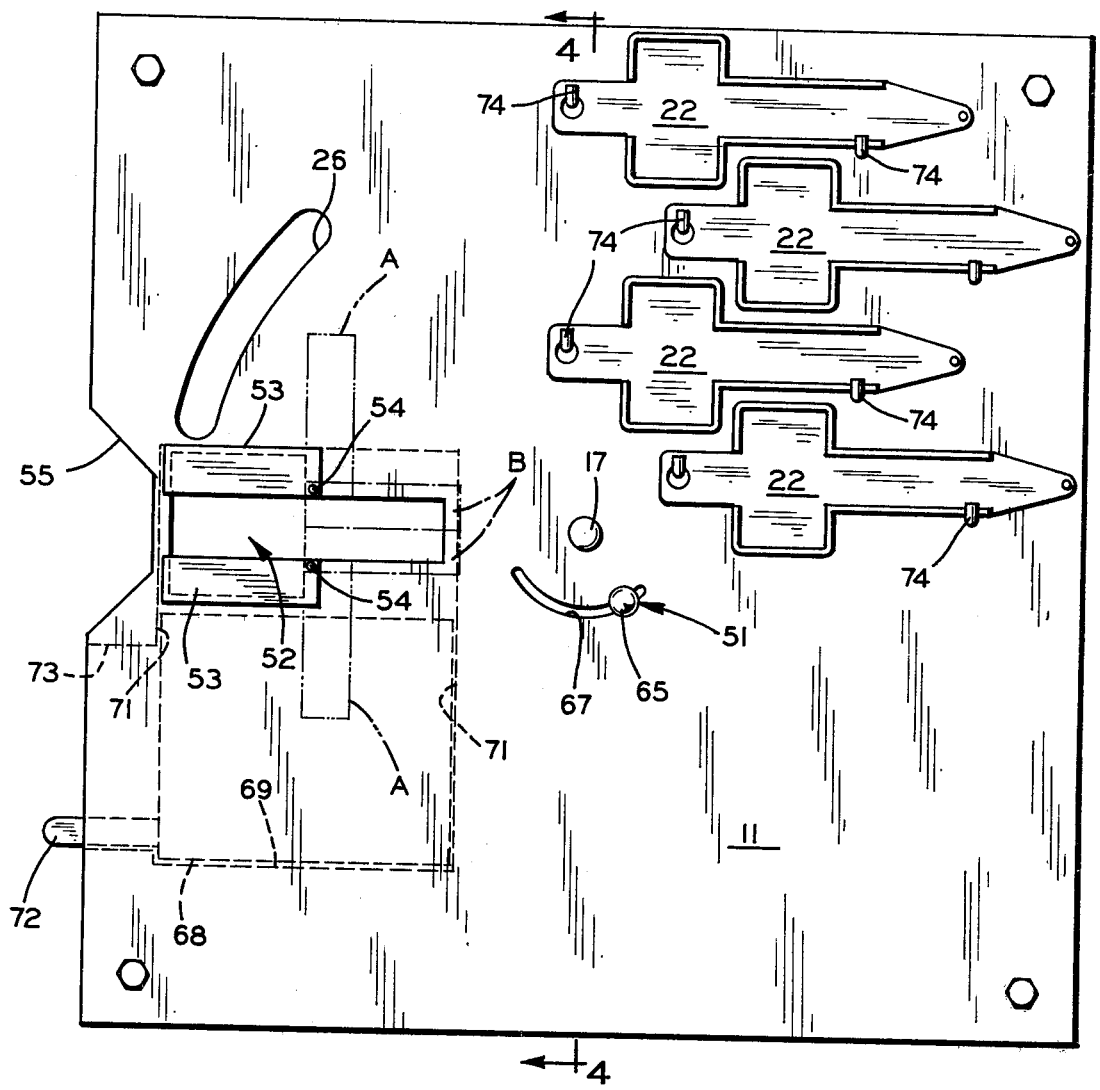
FIG. 2 is a plan view of the front of the device shown in FIG. 1.

Educational exercises are presented to the student by presenting the information to be operated upon in a window 52 in front panel 11. This information or task is borne on the display area of the task plates, in the longitudinal display area 37, the transverse display area 38, or both depending on the nature of the task. Thus, the window 52 has an overall configuration generally corresponding to the display areas 37 and 38 and has masking plates 53 which can be positioned to selectively expose the longitudinal display area 37 as shown in FIG. 2, or as phantomed in FIG. 2, can be rotated about pivot pins 54 to position A whereby the entire window 52 is unmasked, or to position B where only the transverse window area 38 is exposed. Masking plates 53 are rectangular and are pivoted on the panel adjacent the junction of the longitudinal and transverse portions of the window. The pivot pins 54 engage the plates 53 at corners so they are turned about those corners.

In the exemplary embodiment, the longitudinal axis of the display window 52 through which the information on a task plate is viewed, is generally horizontal when the major plane of the device, the panels 11 and 12, are vertical and the pockets 21 of the disk 14 are loaded and emptied along that axis and, thus, a horizontal radius of the disk. Finger notches 55 and 56 in the front and rear panel side margins, respectively, provide access to the finger grips 45 on the task plates 22. Notches 55 and 56 are in registry and are aligned radially with the window 52.

Admission and release of the retainer pins by the retainer rings along the axis of the window is facilitated by apertures 57, 58 and 59 in each of retainer rings 47a, 47b and 47c, respectively, which are centered on the horizontal radius extending from pivot 17 and are of a greater width than the width of the retainer pins 43. In order to guard against the inadvertent loss of the task plates 22 from pockets 21, a gate assembly 51 may be provided for each of the apertures 57, 58 and 59.

Figure 5:
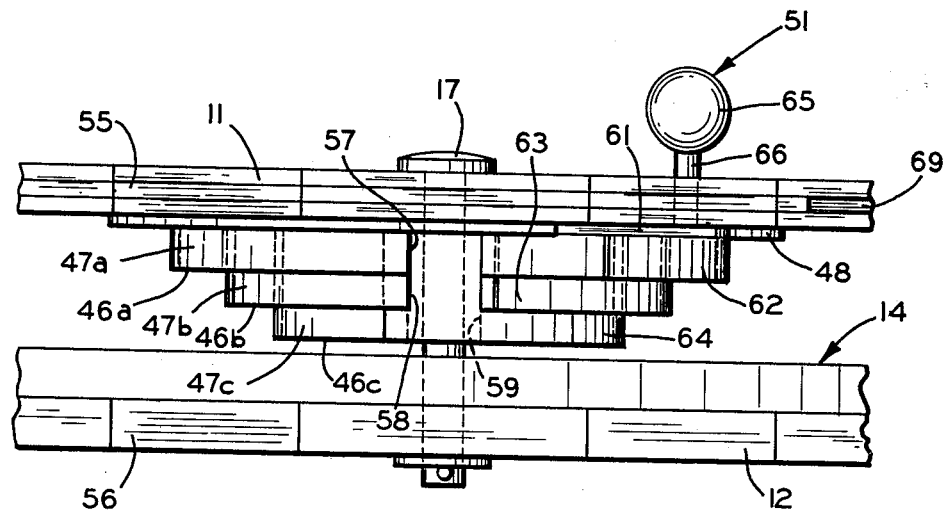
FIG. 5 is a broken away elevational view taken along the radius of the display window to illustrate the retainer ring apertures for the admission and release of detents for the problem bearing elements and the gates for selectively opening or closing those apertures.

The gates for each of the apertures 57, 58 and 59 can be arranged to be opened and closed simultaneously, or they can be arranged to be opened in sequence, advantageously the sequence provided by the form shown in FIGS. 1, 3 and 5 whereby the gate of the outermost retainer ring is opened in a first position while the remainder of the gates are closed. In succeeding positions, the middle ring and innermost gates are opened.

The retainer ring gate assembly comprises a base arm 61 pivoted on the pivot 17 for disk 21 and thus the center for the retainer rings 47a, 47b and 47c. Sectors of rings having radii of curvature at radii from pin 17 corresponding to the radii of the rings plus their thickness are mounted on arm 61 with their rearmost arcuate edges at a height corresponding to the respective rings. This presents an essentially continuous circular lip over which retainer pins 43 are engaged when the gate is closed. As shown, the gates are sectors 62, 63 and 64 of right circular cylinders of the height of their respective retainer rings 47a, 47b and 47c secured directly to and upstanding from arm 61. When the arm 61 is moved about pivot 17, the sectors 62, 63 and 64 track over the outer faces of retainer rings 47a, 47b and 47c, and can be moved from a position blocking apertures 57, 58 and 59 to one clearing those apertures.

In the illustrated embodiment, the gates are arranged to open successive apertures beginning with that aperture 57 in the largest diameter retainer ring 47a which retains the tier of task plates 22 nearest the back side of the front panel and, thus, the first to be exposed through the window 52. This gate assembly is shown in FIG. 5 with sector 64 for the ring 47c closing its aperture 59 and with sectors 63 and 64 for rings 47b and 47a free of their apertures 58 and 59, respectively. As shown, the gate assembly 51 is positioned to release the first and second tiers of task plates so that the plates can be removed for the first and second rounds of the teaching exercise.

It is to be appreciated that the round selection feature is provided by virtue of the lengths of sectors 62, 63 and 64. Each of these sectors subtend different arcs extending from base arm 61. The first retainer ring 47a having a sector 62 of a shorter arc by at least the width of the gate 58 of the next inner retainer ring 47b than the arc of the next outer sector 63 so that aperture 58 can be kept closed when aperture 57 is cleared. Similarly, sector 64 for the outer retainer ring 47c exceeds in its subtended arc the arc of sector 63 by a length at least equal to the width of aperture 59 in retainer ring 47c. This arrangement presents a staggered array of leading edges of the sectors with that of sector 64 preceding that of 63 which preceds that of 62 so that at one angular setting, the sector 62 exposes the gap of aperture 57 without the remaining ring apertures being exposed. At a further angular setting, the apertures 57 and 58 are cleared by sectors 62 and 63, while aperture 59 remains closed by sector 64. At a still further setting, all apertures are cleared by their gating sectors.

Control of the setting of gate assembly 61 is afforded by control knob 65 mounted on base arm 61 by column 66. Column 66 extends through arcuate slot 67 in front panel 11. In this arrangement, it is to be appreciated that interference between the sectors 62, 63, and 64 and their respective retaining rings 47a, 47b and 47c is to be avoided by positioning one inside the other and that interference between the rings and sectors on the one hand, and the apices of the inner pie-shaped sections 32 on disk 14 is avoided by positioning those apices on a circumference having a radius greater than any of the sectors or rings.

Another advantageous feature is a mask of the entire window to prevent viewing during the transfer of the disk to bring another pocket of the magazine and its task plate 22 into registration with the window or to prevent the viewing of an underlying task plate. A slide 68 is mounted in a pocket 69 in the thickness of panel 11, and is arranged to be displaced in a plane parallel to the panel in a direction normal to the axis of display window 52. Pocket 69 can be a cut-out region in the central ply of a three-ply front panel 11, and can be arranged to form a track at its side walls 71 which carry the slide in a path across window 52. Displacement of the slide 68 is by means of a tab 72 integral therewith, and extending from the side panel 11 through a slot 73, formed by a portion of the cut-out region in the central ply.

In practice, tiers of three task plates having information on their faces bordered by the beads 44 are mounted in pockets 21 with those faces oriented toward the front panel by insertion of the stacked plates into the pockets 21 aligned with the finger notches 55 and 56. Of course, if a gate 51 is provided, it should be fully open during loading. The plates seat themselves according to the accomodating depths of the retainer rings at their respective levels. In that condition, all finger grips of the tier are within the limits of the panels 11 and 12 throughout all positions of the disk magazine, except those aligned with the finger notches 55 and 56. The disk magazine is turned about central pivot 17 to bring another pocket into alignment with the finger notches 55 and 56, and the retaining ring apertures 57, 58 and 59, whereupon another stack of task plates is inserted and seated. When the desired number of task plates has been loaded, the gate assembly, if one is provided, is shifted to retain the plates by positioning sectors 62, 63 and 64 across apertures 57, 58 and 59.

One use of the device is as a vocabulary development tool wherein a word on a task plate is presented at the display window and, if correctly defined, the task plate is withdrawn and awarded the student. An incentive is provided by displaying the award. This is accomplished while maintaining the challenge of the task before the student and his classmates by an arrangement of hangers 74 on the front face of panel 11 as shown in FIG. 2. In one arrangement, where students are competing, two columns of task plates 22 can be established, one for each of the competitors.

Recapitulating the invention, it comprises an educational display board device including a front panel 11 having a display window 52. Mounted upon panel 11 for movement relative thereto in a magazine 14 arranged to receive a plurality of task plates 22 in spaced apart stations 21. The stations advantageously are arrayed in a planar arcuate pattern which can be circular. Magazine 14 moves in a path to bring successive stations and the task plates they contain into registry with the window 52. When plates are in registry with the window, they can be selectively withdrawn from the magazine by means of finger grips 45 provided selectively operable means, gate assembly 51 to retain the task plates, have been set to their release condition. In the movement of the magazine, the task plates are retained by rings 47 or at least sectors of right circular cylinders concentric with the pivot axis of the magazine. Plural rounds of challenges can be presented the students by stacking the task plates in tiers in each magazine station 21. Retaining pins, detents or protuberances 43 track in the space between the concentric retaining rings to maintain the tiered relationship of the task plates in a single station. Means are provided to selectively mask the window in its entirety by slide shutter 68 or partially by pivotally masking plates 53.

While the board arrangement has been disclosed in a specific configuration with a number of adjunts, it is to be appreciated that certain of the elements can be omitted or modified to meet the requirements of the specific application. Further, the magazine can be made to track only a portion of an arc rather than a full circle or even a linear path. Accordingly, the invention, as disclosed, is to be read as illustrative of the inventive concepts and not in a limiting sense.

What is claimed is:

1. An educational device comprising a front panel having a display window; a plurality of task plates bearing information on a face to be presented in said display window; a magazine having a plurality of spaced apart stations each for supporting one of said task plates; means mounting said magazine for movement relative to said front panel behind said front panel along a path which successively brings each station and said task plates into registry with said window, said front panel blocking said task plates from view except for one of said task plates in registry with said window; and means for selectively withdrawing said task plates from said magazine.

2. An educational device according to claim 1 including means to retain said task plates in said magazine in all positions of said task plates established by said magazine except that in registry with said window.

3. An educational device according to claim 1 including means to selectively mask said window.

4. An educational device according to claim 2 including selectively operable retaining means for retaining said task plates in said magazine when in registry with said window.

5. An educational device according to claim 1 wherein said front panel is planar, said magazine mounting means is a pivotal connection between said magazine and said panel, said array of stations of said magazine is arcuate around said pivotal connection and is in a plane parallel to said panel.

6. An educational device according to claim 1 including means for releasably maintaining said task plates within said magazine mounting stations.

7. An educational device according to claim 5 including a sector of a right circular cylinder concentric with said pivotal connection upstanding from said panel toward said magazine and a detent on each task plate releasably engageable with said sector whereby said task plate is maintained in a station in said magazine over a range of relative motion between said magazine and said panel.

8. An educational device according to claim 1 including means for releasably maintaining a plurality of task plates within each of a plurality of magazine mounting stations.

9. An educational device according to claim 8 including means to orientate said plurality of task plates superposed in tiered relationship.

10. An educational device according to claim 8 including a plurality of spaced apart rings concentric with said pivotal connection and upstanding from said panel toward said magazine, each of said rings having a lesser height from said panel than its next innermost ring; and a detent on each task plate releasably engageable with one of said rings whereby said task plates are maintained in a station in said magazine in a tiered superimposed relationship over a range of relative motion between said magazine and said panel.

11. An educational device according to claim 6 wherein said means for releasably maintaining said task plate within said magazine mounting station includes a protuberance on the information bearing face of said task plate.

12. An educational device according to claim 11 including an upstanding peripheral lip on the information bearing face of said task plate of a height generally equal to the height of said protuberance on those portions of said plate spaced from said protuberance, and a region adjacent said protuberance having no lip.

13. An educational device comprising a front and rear panel; means maintaining said panels in spaced parallel, registration in their major planes; said front panel having a viewing window; a plurality of task plates having display surfaces bearing information to be displayed through said viewing window; a magazine having a spaced apart planar array of stations for mounting said task plates; means mounting said magazine between said front and rear panels for movement of said stations coplanar with said panels along a path which registers each of a plurality of task plates stations with said viewing window, said front panel blocking said task plates from view except for one of said task plates in registry with said window; means for maintaining said task plates in said magazine; and means effective when said magazine positions a task plate in registry with said viewing window to release said task plate from said maintaining means for separation from said device.

14. An educational device according to claim 13 wherein said task plates have a retaining member on the surface proximate said front panel when said plates are mounted in said magazine; and wherein said means for maintaining said task plates in said magazine is mounted on the face of said front panel proximate said rear panel and engages with said retaining member throughout a range of movement of said task plate by movement of said magazine.

15. An educational device according to claim 14 wherein said retaining member is a pin upstanding from said task plate and wherein said means for maintaining said task plates includes a channel for receiving said pin.

16. An educational device according to claim 13 wherein said mounting means for said magazine is a pivotal coupling to at least one of said panels, said pivotal coupling having an axis normal to said panels and wherein said magazine supports said task plates in a radial array around said pivotal coupling.

17. An educational device according to claim 16 wherein said retaining member is a pin upstanding from said task plate and said means maintaining said task plate includes an arcuate channel having a fixed radius around the axis of said pivotal coupling for receiving said pin.

18. An educational device according to claim 17 wherein said channel has an opening positioned for the release of said detent when said magazine positions said task plate in registry with said window.

19. An educational device according to claim 18 including a selectively moveable gate for said channel opening moveable between a position clearing said opening and a position blocking said opening.

* * * * *